| United States Patent [19] | [11] | 4,069,183 |
|---|---|---|
| Daimer | [45] | Jan. 17, 1978 |

[54] AQUEOUS STOVING COATING COMPOSITION COMPRISING N-OXIDE STRUCTURES CONTAINING POLYHYDROXY COMPONENTS

[75] Inventor: Wolfgang Daimer, Graz, Austria

[73] Assignee: Vianova Kunstharz, A.G., Vienna, Austria

[21] Appl. No.: 637,010

[22] Filed: Dec. 2, 1975

[30] Foreign Application Priority Data

Dec. 4, 1974 Austria .................................. 9708/74

[51] Int. Cl.$^2$ ............................................. C08L 61/10
[52] U.S. Cl. .............................. 260/29.3; 260/29.2 N; 260/29.2 E; 260/29.2 TN; 260/29.4 R; 428/425; 428/458; 428/460
[58] Field of Search ............ 260/29.4 R, 29.3, 830 R, 260/835, 836, 29.2, 29.2 N, 29.2 E, 29.2 TN; 428/418, 460; 252/182

[56] References Cited

U.S. PATENT DOCUMENTS

| 3,102,102 | 8/1963 | Weidner ............................ 260/851 X |
| 3,474,060 | 10/1969 | Dhein et al. ................ 260/29.4 R X |

*Primary Examiner*—Theodore E. Pertilla
*Attorney, Agent, or Firm*—A. W. Breiner

[57] ABSTRACT

Aqueous coating compositions are described characterized in that the resin binder comprises (a) from about 5 to 90 percent by weight of a water-soluble polyhydroxy component containing at least about 1 mole of amine oxide structure in 1000 grams of solids; and (b) from about 5 to 90 percent by weight of a polycarboxy component having an acid value of from about 30 to 280 mg KOH/g, the carboxy groups of which are partially or completely neutralized with a nitrogen base; components (a) and (b) forming a physical blend or a partial condensation product, the degree of said partial condensation not surpassing the solubility of the composition. Optionally, the coating composition can include from about 5 to 40 percent by weight of a polyvalent resin without polyelectrolyte character which will react with hydroxyl groups. Paint formulations of the coating compositions can be formulated with water constituting more than about 70 percent of the total solvent content. The coating formulations with the high water content have suitable viscosity characteristics and provide coatings having good durability, impact resistance, and corrosion resistance.

9 Claims, No Drawings

AQUEOUS STOVING COATING COMPOSITION COMPRISING N-OXIDE STRUCTURES CONTAINING POLYHYDROXY COMPONENTS

The present invention is directed to water-dilutable coating compositions. More specifically, the invention is directed to water-dilutable coating compositions which can comprise up to 70 percent and more water as the solvent without exhibiting abnormal viscosity characteristics. The coating compositions comprise a high molecular weight water-soluble polyhydroxy component containing amine oxide structure and a polycarboxylic acid at least partially neutralized with a nitrogen base.

Water-dilutable coating compositions have been produced by combining low molecular weight water-soluble or hydrophilic polyhydroxy compounds with carboxylic compounds. If high molecular weight polyhydroxy compounds are used, it is necessary to subject these compounds to a partial condensation owing to their insolubility in water to achieve satisfactory solubility of the whole system in water. In most cases such systems contain partially or completely etherified polymethylol derivatives of amine compounds or of phenols.

The present invention provides coating compositions comprising polycarboxylic acid resins, polyhydroxy compounds and, optionally, polyvalent crosslinking resins in which the polyhydroxy compound is at the same time of high molecular weight and water soluble, thus offering a series of advantages over known coating compositions. Since the polyhydroxy compound is soluble in water, the auxiliary organic solvents can be kept at a low level and, accordingly, the systems are of non-polluting character. Since molecular weight is much higher than with compositions employing simple polyalcohols, the cured films also have higher molecular weights and are completely crosslinked, providing enhanced corrosion resistance for the coated objects.

The water-dilutable stoving coating compositions of the invention, which optionally can contain pigments, extenders, or additives, are characterized in that they comprise a mixture or a partial condensation product of a. from about 5 - 90, preferably from about 25 - 70, percent by weight of a water-soluble polyhydroxy compound containing at least about 1 mole of amine oxide structure in 1000 g of solids, b. from about 5 - 90, preferably from about 25 - 45, percent by weight of a polycarboxy component with an acid value of from about 30 - 280 mg KOH/g, the carboxy groups of which are partly or completely neutralized with nitrogen bases, and, optionally, c. from about 5 - 40, preferably from about 5 - 30, percent by weight of a polyvalent resin with non-polyelectrolyte character and capable of reacting with hydroxy groups, preferably a melamine-formaldehyde condensate at least partly etherified, the partial condensation not going beyond the soluble state of the blend.

A special advantage of the present invention is that in the paint formulations of the coating compositions ready for application more than 70 percent of the total solvents can be water. The balance of the solvents can be aliphatic alcohols such as ethanol, butanol, decanol, or ethers of ethylene glycol, e.g., ethylene glycol monoethylether and ethyleneglycol monobutyl ether. Small quantities of high boiling solvents can be coemployed such as diacetone alcohol and diethyleneglycoldiethylether. The solvents need not be infinitely dilutable with water.

Prior to this invention, the use of polyhydroxy compounds rendered water soluble through the inclusion of an amine oxide structure in aqueous coating compositions was unknown. Such polyhydroxy compounds are obtained in simple manner by reacting hydroxy functional macromolecules carrying tertiary basic nitrogen atoms with hydrogen peroxide or another compound or substance splitting off oxygen. Through the modification of the basic tertiary nitrogen atoms to amine oxide structure, the high molecular weight polyhydroxy compound becomes water soluble without neutralization, if it contains at least 1 mole of amine oxide structure in 1000 g of solids.

Hydroxy group containing macromolecules with tertiary basic nitrogen atoms suitable for reaction with hydrogen peroxide are, e.g., formed through an addition reaction of epoxy groups containing intermediates with secondary amines or with alkanol amines. The best known epoxy group containing intermediates with the joint characteristic of the presence of structures of general formula I are the glycidyl ethers

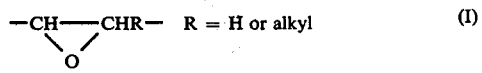

of phenols, particularly of 2,2'-bis(4-hydroxyphenyl)-propane (Bisphenol A). Further known products are the glycidyl ethers of phenol-formaldehyde condensates of the novolak type, glycidylesters of aliphatic mono- or dicarboxylic acids, glycidylethers of aliphatic and aromatic diols, copolymers of glycidyl acrylate or glycidylmethacrylate or epoxidized aliphatic or alicyclic olefines. A M. Paquin, *Epoxidverbindungen und Epoxyharze*, Springer, 1958, thoroughly describes such products. Secondary amines suitable for the addition reaction with epoxy groups are, e.g., dimethyl amine, diethyl amine, or higher homologues and isomers. Secondary alkanol amines are also suitable, e.g., diethanol amine, diisopropanol amine or higher homologues and isomers, as well as cyclic secondary amines like ethylene imine, morpholine, and piperidine. The weight ratios for the two reaction partners can be varied within wide limits, provided a sufficient number of basic nitrogen atoms is formed so that a water-soluble macromolecule is obtained upon the subsequent formation of the amine oxide. An excess of secondary amine is generally not recommended, since it does not participate in the formation of the desired macromolecule. Through the addition reaction between the epoxy groups and the secondary amines, hydroxy groups are also formed besides the tertiary basic nitrogen atoms. Through the use of secondary alkanol amines, the hydroxy content can be further reacted with mono- and/or polycarboxylic acids or mono- and/or di- and/or polyisocyanates.

Another group of macromolecules with the basic tertiary nitrogen atoms is formed through polymerization of suitable basic monomers, optionally in the presence of other copolymerizable monomers. Exemplary basic monomers are the acrylates or methacrylates, e.g., N,N-dimethylaminoethylacrylate or methacrylate, or vinylpyridine, N-vinylimidazol, and N-vinylcarbazol. These compounds can either be used as homopolymers or preferably as copolymers with acrylates or methacrylates, acrylamides or methacrylamides, aromatic vinyl compounds like styrol, vinyltoluol, alpha-methylstyrol, etc. The introduction of hydroxy groups into the macromolecule can be effected through copolymerization with hydroxyl containing monomers like allyl alcohol, ethyleneglycolacrylate or methacrylate, propyleneglycolacrylate or methacrylate.

Another group of macromolecules with basic tertiary nitrogen atoms are substituted oxazolines, e.g., obtained through cyclizing condensation of amine alcohols, like 2-amino-2-hydroxymethyl-1,3-propanediol, with aliphatic carboxylic acids. A comprehensive demonstration of the oxazolines is given by J. A. Frump, *Chemical Reviews*, 1971, Vol. 71, No. 5, pages 483–505.

In the formation of the desired amine oxide groups, the organic macromolecules carrying tertiary nitrogen atoms are reacted with a compound or substance which splits off oxygen. The preferred substance is hydrogen peroxide and can be used at any desired concentration in water. Other suitable substances are peroxo acids such as peroxo acetic acid or peroxobenzoic acid, as well as ozone. The reaction condition for the polymer analogous amine oxide formation can be varied within wide limits. Preferably, the temperature of the reaction will range from about 0° – 150° C. in the presence of saponifiable ester linkages in the macromolecules. Generally, the lower temperatures in the above range are particularly preferred. Inert solvents for dilution of the macromolecule can be present, but in most cases are not necessary.

For satisfactory solubility in water of the macromolecular polyhydroxy component, the presence of at least about 1 mole of amine oxide structure in 1000 g of nonvolatile reaction mass is in general necessary. The quantity of tertiary nitrogen atoms, thus, should not be less than about 1 mole in 1000 g of substance. When using equimolecular quantities of oxygen splitting substance — in relation to tertiary nitrogen atoms of the macromolecule, in most cases the mass becomes clearly soluble in water before the total amount of peroxide is consumed. In such cases it is possible to reduce the quantity of peroxide or to remove the excess peroxide by adding reducing compounds like formic acid or by distillation.

Besides the amineoxide containing polyhydroxy components, the coating compositions of the invention contain from about 5 – 90 percent of resinlike polycarboxy components with an acid number of from about 30 to 280 mg KOH/g. These polycarboxy components can be synthesized in numerous ways. One method of synthesis is through the reaction of hydroxy-rich precondensates with dicarboxylic or tricarboxylic acids, e.g., hydroxy-rich polyesters or polyurethanes with phthalic anhydride or trimellitic anhydride. Preferred polycarboxy compounds are addition products of dienophilic compounds, e.g., maleic anhydride to unsaturated compounds with a molecular weight of over 500. Such compounds are the esters of natural unsaturated fatty acids, optionally in mixture with portions of saturated fatty acids and rosin acids, with polyalcohols, e.g., glycerol, trimethylolpropane, pentaerythritol, or with epoxy compounds like Bisphenol-A-glycidyl ethers. Another suitable group of unsaturated compounds capable of addition reactions are diene polymers exemplified by butadiene and isoprene. With all such addition compounds of maleic anhydride, the anhydride ring prior to its use as a polycarboxy compound is split with water or monohydric alcohols. Other suitable polycarboxy components are copolymers of acrylic acids or methacrylic acids with other alpha, beta-ethylenically unsaturated monomers, like acrylates or methacrylates, styrol, vinyltoluol, acrylamide, methacrylamide or, optionally, their etherification products with formaldehyde. The essential characteristic, as noted above, is that the polycarboxy component have an acid number of from about 30 to 280 mg KOH/g. At least a part of the carboxy groups of the polycarboxy component is neutralized with nitrogen bases, such as ammonia, aliphatic amines, or aliphatic alkanolamines. Examples are diethyl amine, triethyl amine, cyclohexyl amine, N,N'-dimethylethanol amine, and diethanol amine.

In order to increase the degree of crosslinking, the water-dilutable coating compositions of the invention can contain from about 5 – 40 parts by weight of a polyvalent synthetic resin without polyelectrolyte character which will react with hydroxy groups. Such products may be condensation products of aldehydes preferably formaldehyde with phenols, urea or aminotriazines, optionally etherified with monohydric alcohols. Examples are condensation products obtained in alkaline medium from formaldehyde and phenol, cresol, p-tert. butylphenol, Bisphenol A, optionally etherified in slightly acidic medium with monohydric aliphatic alcohols. Suitable aminotriazines are melamine, benzoguanamine, and acetoguanamine. The preferred products are the formaldehyde-rich melamine resins etherified with methanol to the highest possible extent.

The weight ratios between the three components of the coating composition can be varied within relatively wide limits. By varying the ratios of the components and the components themselves, the performance of the coating composition can be tailored to the optimum as dictated by the end use. It has been found that by increasing the level of the new amine oxide structure polyhydroxyl component in the binder, the solids content is much higher at comparable application viscosity. This is due to the fact that the anomaly in viscosity normal in the dilution history of neutralized polycarboxylic resins can be substantially reduced or avoided with the amine oxide structure polyhydroxyl components. By anomaly in viscosity, we mean that with continued increments of water in the binder solution, the viscosity remains constant or even rises over a broad range of concentration. The normal viscosity history of the new coating compositions meets the requirements of industrial practice, since the low levels of water a sufficiently low application viscosity is reached. Thus, the coating compositions are richer in solids and give thicker coatings or films in one application of the paint.

The combination of the three binder components of the invention can be effected through mixing at room temperature or at slightly increased temperature. The partial or complete neutralization of the carboxy groups of the polycarboxy component can also be effected after admixture of the other components or during or after the addition of the pigments and other ingredients of the coating composition. Optionally, a partial condensation can be carried out between the polyhydroxy component and the unneutralized polycarboxy component preferably at temperatures of from about 90° – 140° C. This method is recommended, if the two components do not give a clear blend and if their compatibility is to be enhanced. The condensation must be effected such that the product remains soluble in water upon neutralization with the nitrogen base.

The coatings of the coating compositions of the invention are cured at curing temperatures preferably of from about 100° – 180° C. for from about 5 – 30 minutes. The coating compositions can contain pigments, fillers, paint additives, and other additives known to those skilled in the art. The coemployment of basic pigments, like zinc oxide or calcium carbonate, is critical. Here the precautions usual for aqueous binders apply. Optionally, the pigments and extenders can be milled with one of the components, the others being added afterwards to complete the paint.

PREPARATION OF REACTANTS

Polycarboxylic Component PC-1

180 g of dehydrated castor oil and 120 g of linseed oil in admixture are held at 250° C, and stirred for 1 hour under the protection of inert gas. At 200° C., 100 g of maleic anhydride are added. After about 8 hours of reaction time at 210° C., no free maleic anhydride can be traced. At 100° C., 85 g of diacetone alcohol, 30 g of hydrogen peroxide, and 3 g of triethylamine are added, and the reaction charge held for 2 hours. Thereafter, the batch is cooled. The resin has a solids content of 80 percent and an acid value of 240 mg KOH/g.

Polycarboxylic Component PC-2

150 g of triethylene glycol, 104 g of neopentylglycol, and 192 g of trimellitic anhydride are charged to a reaction vessel equipped with stirrer, Dean and Stark receiver, and thermometer, and heated to 170° C. and held until an acid value of 80 mg KOH/g is attained. In portions, 46 g of a glycidylester of a $C_9$ – $C_{11}$ alpha-branched monocarboxylic acid (Cardura E. Shell) are added and held at 170° C. until the acid value is 48 mg KOH/g. The batch is cooled to 85° C., neutralized with N,N'-dimethylethanol amine, and diluted with water to 75 percent solids.

Polyhydroxy Component PH-1

133 g of diisopropanolamine are heated to 80° C. Within 2 hours, 186 g of bisphenol diglycidyl ether with an epoxy equivalent weight of 185 – 195 are added. The hydroxyl number of DIN 53 240 of the reaction product is 500 mg KOH/g, the efflux time of a 70 percent solution of the resin in ethylene glycolmonoethylether is 250 s DIN 53 211. At 60° C., 113 g of hydrogen peroxide (30 percent) are added dropwise within 1 hour. The reaction is completed through stirring at 60° C. for another hour. The batch is diluted with 45 g of water. The resin has a solids content of 70 percent and can be diluted with water without any turbidity.

Polyhydroxy Component PH-2

744 g of a bisphenoldiglycidylether with an epoxy equivalent weight of 185 – 195 are charged to a reaction vessel equipped with stirrer, reflux condenser, and thermometer. At 60° C., 292 g of diethylamine are added within 1 hour. The reaction is completed by stirring at 100° C. for an additional 2 hours. The efflux time of a 70 percent solution of the resin in ethylene glycol monoethyl ether is 120 s DIN 53 211. At 60° C., 210 g of trimethylhexamethylene diisocyanate are added within 1 hour. The batch is held at 80° C. until no free isocyanate groups can be traced. The batch is diluted with 180 g of 4-methoxyhexanone-2 and cooled to 70° C. 500 g of hydrogen peroxide (30 percent) are added at 70° C. within 3 hours. The batch is diluted with water to 70 percent solids. The resin has an acid number of 0.7 mg KOH/g and can be infinitely diluted with water without precipitations.

EXAMPLE 1

86 g of polyhydroxy component PH-1 and 50 g of polycarboxyl component PC-1 are charged to a reaction vessel equipped with reflux condenser, thermometer, and stirrer and heated to 90° – 100° C. The temperature is held until the initial acid value of 109 mg KOH/g has fallen to 90 mg KOH/g. The batch is diluted with 24 g of ethyleneglycol monoethyl ether. 6 cc of triethylamine are added and the batch is diluted with distilled water. The viscosities recorded on solutions with decreasing solids are tabulated in Table 1. The ratio of carboxy to hydroxy groups is about 1 : 3.

The 45 percent solution is flowed out on mild steel and allowed to set at room temperature for 15 minutes. The film is cured at 160° C. for 30 minutes and shows good gloss, clarity, and mar resistance.

EXAMPLE 2

93.5 g of polycarboxy component PC-2, 14.3 g of polyhydroxy component PH-1, and 20 g of hexamethoxymethylmelamine are mixed at room temperature and diluted to 65 percent solids with 26 g of ethylene glycol monoethyl ether. The resin is diluted further with water only. The viscosities recorded on solutions with decreasing solids are tabulated in Table 1.

The 60 percent solution is flowed out on mild steel and allowed to set at room temperature for 15 minutes. The film is fully cured at 150° C. for 30 minutes. The film is hard, radiant, and slightly yellowish.

EXAMPLE 3

12.5 g of polycarboxy component PC-1, 100 g of polyhydroxy component PH-2, and 22 g of a 90 percent solution in ethyleneglycol monoethyl ether of hexamethoxymethylmelamine are homogenized at room temperature. Upon addition of 20 g of ethylene glycol monoethylether the solids content is 65 percent. The resin is neutralized with 2 cc of triethylamine and diluted with deionized water. The viscosities recorded on solutions with decreasing solids are tabulated in Table 1.

The 50 percent aqueous resin solution is flowed out on a steel panel and allowed to set for 10 minutes at room temperature. The film is fully cured at 140° C. for 30 minutes. The hard, yellowish film of 30 $\mu$m thickness is obtained with an impact resistance of 80 inch. pound. When immersed in distilled water for 100 hours, no blisters are noted.

TABLE 1

Viscosities (centipoise) of aqueous binder solutions at various solids contents.

Table 1:

| Viscosities (centipoise) of aqueous binder solutions at various solids contents. | | | | | |
|---|---|---|---|---|---|
| | 60% | 55% | 50% | 45% | 40% |
| Example 1 | 3596 | 1558 | 565 | 390 | 210 |
| Example 2 | 250 | 170 | 115 | 55 | |
| Example 3 | 1043 | 876 | 326 | 195 | 95 |

As will be apparent to one skilled in the art, various modifications can be made within the scope of the aforesaid description. It is possible to modify the resinous components provided they fall within the critical characteristics set forth in the specification. Moreover, it is possible to modify the coating compositions in known manner by the inclusion of conventional additives for their intended purpose. These modifications being within the ability of one skilled in the art form a part of the present invention and are embraced by the appended claims.

It is claimed:

1. Aqueous coating compositions characterized in that the resin binder comprises
   a. from about 5 – 90 percent by weight of a water-soluble polyhydroxy component containing at least about 1 mole of amine oxide structure in 1000 g of solids, and
   b. from about 5 – 90 percent by weight of a polycarboxy component having an acid value of from about 30 to 280 mg KOH/g, the carboxy groups of which are partially or completely neutralized with a nitrogen base;

components (a) and (b) forming a physical blend or a partial condensation product, the degree of said partial condensation not surpassing the solubility stage of the composition.

2. The coating composition of claim 1 including from about 5 to 40 percent by weight of a polyvalent resin which will react with hydroxy groups without polyelectrolyte characteristics.

3. The coating composition of claim 2 wherein component (a) comprises from about 25 to 70 percent and component (b) comprises from about 25 to 70 percent of the coating composition.

4. The coating composition of claim 3 wherein the polyvalent resin comprises about 5 to 30 percent by weight of the coating composition.

5. The coating composition of claim 1 wherein the polyhydroxy component is produced through an addition reaction of 1,2 epoxy group containing intermediates with secondary amines or alkanol amines, followed by formation of the amine oxide structure.

6. The coating composition of claim 1 wherein the polyhydroxy component is produced by the reaction of basic monomers containing tertiary amine groups, followed by formation of the amine oxide structure.

7. The coating composition of claim 1 wherein the polycarboxy component is an addition product of a dienophilic compound.

8. The coating composition of claim 2 wherein the polyvalent resin is a condensation product of formaldehyde and a member of the group consisting of phenols, urea, and aminotriazines.

9. The coating composition of claim 8 wherein the aminotriazine is melamine.

* * * * *